United States Patent [19]
Moddel et al.

[11] Patent Number: 5,943,104
[45] Date of Patent: Aug. 24, 1999

[54] LIQUID CRYSTAL EYEWEAR WITH TWO IDENTICAL GUEST HOST SUBCELLS AND TILTED HOMEOTROPIC ALIGNMENT

[75] Inventors: Garret R. Moddel; David Doroski, both of Boulder, Colo.

[73] Assignee: University Technology Corporation, Boulder, Colo.

[21] Appl. No.: 08/826,315

[22] Filed: Mar. 25, 1997

[51] Int. Cl.$^6$ ............... G02F 1/1347; G02F 1/1335; G02F 1/1337; C09K 19/60
[52] U.S. Cl. ............... 349/13; 349/74; 349/120; 349/130; 349/165
[58] Field of Search ............... 349/130, 34, 74, 349/120, 13, 165

[56] References Cited

U.S. PATENT DOCUMENTS

| | | | |
|---|---|---|---|
| 4,279,474 | 7/1981 | Belgorod | 349/13 |
| 4,813,770 | 3/1989 | Clerc et al. | 350/347 |
| 4,917,472 | 4/1990 | Margerum et al. | 349/34 |
| 5,067,795 | 11/1991 | Senatore | 349/14 |
| 5,493,426 | 2/1996 | Johnson et al. | 349/130 |

OTHER PUBLICATIONS

T. Uchida, H. Seki, C. Shishido, and M. Wada, "Guest–Host Interactions in Nematic Liquid Crystal Cells with Twisted and Tilted Alignments," 1979, Mol. Cryst. Liq. Cryst.

T. Uchida, M. Ohgawara, and M. Wada, "Liquid Crystal Orientation on the Surface of Obliquely–Evaporated Silicon Monoxide with Homeotropic Surface Treatment," Nov. 1980, Japanese Journal of Applied Physics.

D.L. White and G.N. Taylor, "New Absorptive Mode Reflective Liquid–Crystal Display Device," Nov. 1974, Journal of Applied Physics.

F. Gharadjedaghi and R. Voumard, "Mathematical Simulation of a Positive Contrast Guest–Host Display Using Nematic–Cholesteric Phase Change," Nov. 1982, Journal of Applied Physics.

Bahadur, Birendra "Liquid Crystals—Applications and Uses, vol. III: Chapter 11 Dichroic Liquid Crystal Displays" pp. 176–185, 1992.

*Primary Examiner*—William L. Sikes
*Assistant Examiner*—Kari M. Horney
*Attorney, Agent, or Firm*—Stephen C. Shear

[57] ABSTRACT

Light responsive, transmissivity variable eyewear utilizing two specifically configured liquid crystal cells and a method of making the cells is disclosed. The cell itself includes a pair of spaced apart transparent substrates in confronting parallel relationship to one another, transparent electrodes exposed over the outer surfaces of the substrates and connectable to a voltage control arrangement, a liquid crystal mixture contained between the substrates and tilted homeotropic alignment layers formed on the inner confronting surfaces of the substrates. The liquid crystal mixture contains a liquid crystal material with a negative dielectric anisotropy and dichroic dye molecules. All of which cooperate with one another such that the cell is highly transparent indoors, that is, out of the sunlight and is much less transparent, that is dark, in the sunlight.

3 Claims, 2 Drawing Sheets

LIQUID CRYSTAL EYEWEAR WITH TWO IDENTICAL GUEST HOST SUBCELLS AND TILTED HOMEOTROPIC ALIGNMENT

BACKGROUND OF INVENTION

The present invention relates generally to liquid crystal cells and more particularly to specifically configured liquid crystal cells especially suitable for use in light responsive, transmissivity variable eyewear, to the eyewear itself and to different methods of making the cells.

Light responsive, transmissivity variable eyewear is known in the prior art. One example is diagrammatically illustrated in FIG. 1 and generally indicated by the reference numeral 10. Eyewear 10 is shown including a frame 12 which contains spaced apart liquid crystal cells 14, one of which will be described in more detail immediately below in conjunction with FIG. 2. These cells are driven by circuitry including a solar cell 16 supported by frame 12 such that the transmissivity of each cell 14 varies inversely to at least a limited extent with the amount of light reaching the solar cell. Thus, under low light ambient conditions, for example at night or in a dark restaurant, cells 14 will be highly transmissive and outdoors on a sunny day the cells will darken and function as sunglasses.

FIG. 2 diagrammatically illustrates one of the cells 14 in detail and the circuitry necessary to drive it in the manner described above. Specifically, as seen in FIG. 2, each cell 14 includes a pair of spaced apart transparent substrates 18 in confronting parallel relationship to one another so as to include outer surfaces 20 and inner confronting surfaces 22 which are uniformly spaced apart from one another along the entire extent of the substrates. For purposes of clarity, the two substrates 18 have been shown much thicker than they actually are and the spacing has been exaggerated. In addition, while they are in confronting parallel relationship to one another, this does not preclude the substrates from defining gentle or even somewhat abrupt curves, depending upon the application of the eyewear. In any case, transparent electrodes 24, again exaggerated in thickness for purposes of clarity, are disposed over the inner surfaces of substrates 18 and, at the same time, they are connected to a voltage control arrangement 26 which includes previously recited solar cell 16. Voltage control arrangement 26 is designed to apply a voltage across the substrates in a direction normal to their inner and outer surfaces which is a function of the amount of light that reaches solar cell 16 so that, in the absence of light, no electric field is present.

Still referring to FIG. 2, a guest-host liquid crystal/dye mixture 28 is contained between the inner confronting surfaces of the substrate, which surfaces define a spacing therebetween for receiving the liquid crystal/dye mixture. The spacing is sealed by suitable means not shown and is maintained uniform in thickness along the entire extent of the substrates by suitable spacing members, two of which are shown at 30 in the form of transparent spacer balls. The means of spacing is not limited to the use of spacer balls. The guest-host liquid crystal/dye mixture includes liquid crystal molecules having negative dielectric anisotropy and defining long axes and dichroic dye molecules which also define long axes and which preferentially absorb light that is polarized along their long axes. The liquid crystal making up this mixture may be, for example, cholesteric (TNLC) liquid crystal as described in Senatore U. S. Pat. No. 5,067,795.

In addition to the components described thus far, each liquid crystal cell 14 includes homeotropic alignment means 32 disposed on the inner confronting surface of each of the substrates 18 for acting on the guest-host liquid crystal/dye mixture (i) such that, in the absence of an electrical field across the substrates, the long axes of the liquid crystal and dye molecules line up relative to the substrates in a way which causes the dye molecules not to absorb most of the light that is directed through the guest-host liquid crystal/dye mixture normal to the substrates, whether the light passing therethrough is polarized or not whereby the liquid crystal cell remains in a relatively clear state in the absence of the electric field, and (ii) such that in the presence of the electric field across the substrates, the long axes of the liquid crystal and dye molecules line up relative to the substrates in a way which causes the dye molecules to absorb at least some light that is directed through the guest-host liquid crystal/dye mixture normal to the substrates, so long as the last mentioned light is polarized along the long axes of the dye molecules, whereby the liquid crystal cell darkens in the presence of the electric field. In the case of voltage control arrangement 26 including solar cell 16, outside at night or in a dark room, the solar cell will not be exposed to light and therefore no electric field will be present and, hence, eyewear 10 will function in its clear state. On the other hand, outside during the day in the sunlight, the eyewear will function as sunglasses.

One problem with the liquid crystal eyewear of the prior art, specifically sunglasses, relates to their achievable contrast ratio as they switch between clear and dark states. Specifically, heretofore, the liquid crystal sunglasses Applicants are aware of display a relatively low contrast ratio, which means that the difference between their clear and dark states is relatively small. Moreover, regarding these sunglasses Applicants are aware of their clear state is not particularly clear so that the end product is relatively dark in the clear state and relative clear in the dark state, which of course is the worst of all worlds, at least as for as Applicants are concerned.

Having described prior art eyewear 10 generally, attention is now directed to a specific example of prior art eyewear.

A specific example of eyewear in the prior art is described in the previously mentioned Senatore U. S. Pat. No. 5,067, 795. There, the nematic liquid crystal having a negative dielectric anisotropy serves as a host to a guest dye; homeotropic alignment is provided to align the cell in the unpowered state; and the liquid crystal becomes cholesteric (TNLC) in the powered state. In this design, the product of the pitch in the cholesteric and the birefringence ($\Delta n$, called the double refraction in the patent specification) must be much less than a wavelength. This is necessary to avoid adiabatic following of the helix, and hence poor optical absorption. Another constraint is that the pitch must not be too short or the homeotropic (unpowered) state becomes unstable and consequent optical scattering will result. The result of these tradeoffs is that in the Senatore patent, it is stated that the pitch must be 0.9–4 times the cell thickness and the birefringence must be less than 0.12 in the cholesteric phase. Moreover, as is evidenced in Senatore, its reported contrast ratio is not particularly high.

As will be seen hereinafter, Applicants have designed eyewear having a number of advantages including a relatively high contrast ratio in which the clear or light state is substantially clear and the dark state is relatively dark, that is the best of all worlds as for as Applicants are concerned.

SUMMARY OF INVENTION

There are various different drawbacks associated with prior art liquid crystal cells for use in light responsive, transmissivity variable eyewear. As will be seen hereinafter, there are disclosed herein light responsive, transmissivity variable eyewear, liquid crystal cells especially suitable for use in such eyewear and methods of making the cells in accordance with a number of different embodiments which address and overcome one or more of these drawbacks. In each of the embodiments disclosed herein, the liquid crystal cell, whether it is especially suitable for use in light responsive, transmissivity variable eyewear or not, includes a pair of spaced apart transparent substrates in confronting parallel relationship to one another so as to include outer surfaces and inner confronting surfaces, preferably the latter being substantially uniformly spaced from one another along the entire extent of the substrates. Each of these cells also includes a pair of transparent electrodes respectively disposed over the outer surfaces of the substrates and connectable to a voltage control arrangement in which under at least one condition an electric field is applied across the pair of substrates in a direction normal to their inner surfaces. In specific embodiments, the electrodes are connectable to a voltage control arrangement in which under one condition an electric field is applied across the pair of substrates and under a second condition no electric field is applied across the substrates. In all of these embodiments, a liquid crystal mixture is contained between the inner confronting surfaces of the substrates, the mixture including untwisted or parallel nematic liquid crystal molecules (referred to hereinafter merely as parallel nematic liquid crystal molecules) having long axes and negative dielectric anisotropy. In preferred embodiments, the mixture is actually a combination guest-host liquid crystal/dye mixture including the nematic liquid crystal just mentioned and dichroic dye molecules which also define long axes and which preferentially absorb light that is polarized along their long axes.

In addition to the various components recited immediately above, all of the embodiments of the liquid crystal cell disclosed herein include homeotropic alignment means disposed on the inner confronting surface of each of the substrates for acting on the liquid crystal or guest-host liquid crystal/dye mixture. As will be seen immediately below, this alignment means is, in most cases, what distinguishes one embodiment of the present invention from another and what distinguishes the present invention from the prior art, although other features of the present invention also distinguish it from the prior art, as will also be seen.

In accordance with one embodiment of the present invention, which embodiment utilizes an evaporate, preferably SiO, and therefore will be referred to as the SiO embodiment, the alignment means is homeotropic and acts on a guest-host liquid crystal/dye mixture (i) such that, in the absence of an electric field across the substrates, the long axes of said liquid crystal and dye molecules line up relative to the substrates in a way which causes the dye molecules not to absorb substantially any light that is directed through the guest-host liquid crystal/dye mixture normal to the substrates whether the light passing therethrough is polarized or not, whereby the liquid crystal cell is substantially clear in the absence of the electric field and (ii) such that in the presence of the electric field across the substrates, the long axes of the liquid crystal and dye molecules line up relative to the substrates in a way which causes the dye molecules to absorb at least some light that is directed through the guest-host liquid crystal/dye mixture normal to the substrates so long as the last-mentioned light is polarized along the long axes of the dye molecules, whereby the liquid crystal cell darkens in the presence of the electric field. In this particular embodiment, the homeotropic alignment means consists essentially of a layer of evaporate, preferably SiO, which is deposited on the inner surface of each of the substrates at a deposition angle of between approximately 30° and approximately 60° with the normal to the substrates and such that the two layers of SiO or other such evaporate are oriented in a predetermined way with respect to one another, preferably such that the two layers of SiO are anti-parallel to one another.

In accordance with a second embodiment of the present invention which will be referred to as the monolayer embodiment since, as will be seen, it utilizes a monolayer as its homeotropic alignment means, the same type of guest-host liquid crystal/dye mixture as recited immediately above is utilized and it responds to the presence and absence of an electric field in the same manner. However, in this embodiment, the homeotropic alignment means includes a monolayer of long-chained molecules deposited on the inner surface of each of the substrates. Each monolayer has its long-chained molecules preferentially oriented in a particular direction which is determined by the monolayer in a particular way. One such homeotropic surfactant monolayer contemplated is octadecyl(18)trimethoxy silane (ODTMS) and another is hexadecyltrichlorosilane (HDTCS).

A still further embodiment of the present invention disclosed herein, like the other embodiments except for the first one, eliminates the necessity to use silicon oxide or a similar evaporate. Rather, this embodiment utilizes two alignment layers, and hence, will be referred to as the two alignment layer embodiment. In this case, a guest-host liquid crystal/dye mixture is again contemplated. However, in the case of the alignment means, in this embodiment it includes (I) a rubbed polymer alignment layer which is disposed directly over the inner confronting surface of each of the substrates and which includes alignment grooves, and (ii) a homeotropic alignment layer deposited over each of the rubbed polymer alignment layers, each of the homeotropic layers being thin relative to the depth of the alignment grooves of the rubbed polymer alignment layers. Each homeotropic alignment layer exerts a greater influence on the liquid crystal and dye molecules than the rubbed polymer alignment in the absence of an electric field and the rubbed polymer alignment layer exerts a greater influence on the liquid crystal and dye molecules than the homeotropic alignment layer in the presence of an electric field.

Yet in accordance with another embodiment of the present invention disclosed herein, there is contemplated the utilization of two liquid crystal cells like those described above or otherwise. The two cells are stacked on top of one another but oriented so that one cell acts on light of one polarization while the other cell acts on light of the opposite polarization. In this way, this dual cell embodiment can provide a greater degree of transparency in the absence of an electric field than some of the other embodiments; indeed it can be substantially transparent, and it can provide a greater degree of opacity in the presence of an electric field than could a single cell, again without a polarizer. As a result, the eyewear made in accordance with this embodiment is able to achieve the desired contrast ratio discussed above.

Yet in accordance with a further embodiment of the present invention, there is disclosed herein a single cell which uses two liquid crystal layers with a divider therebetween and which functions in the same way as the double cell referred to immediately above in order to obtain the desired transparency and contrast ratio.

BRIEF DESCRIPTION OF DRAWING

The present invention will be described in more detail hereinafter in conjunction with the drawing, wherein.

DETAILED DESCRIPTION

Figure 1:
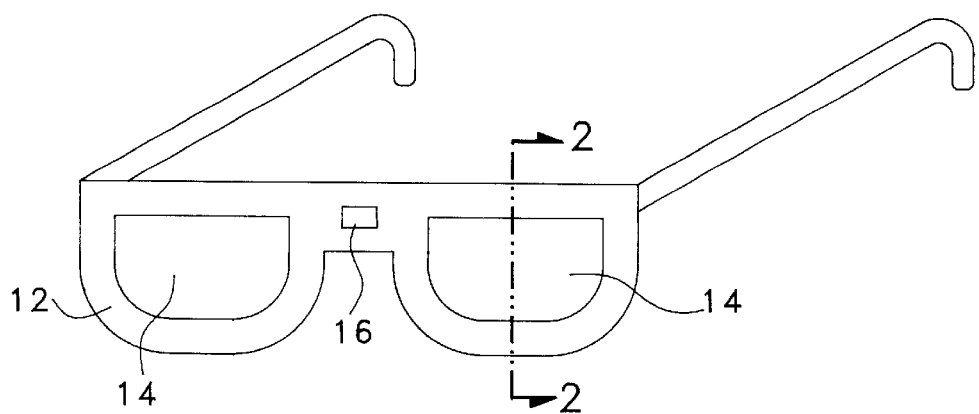
FIG. 1 is a diagrammatic illustration, in perspective view, of eyewear which utilizes liquid crystal cells and which is designed in accordance with the prior art.
Figure 2:
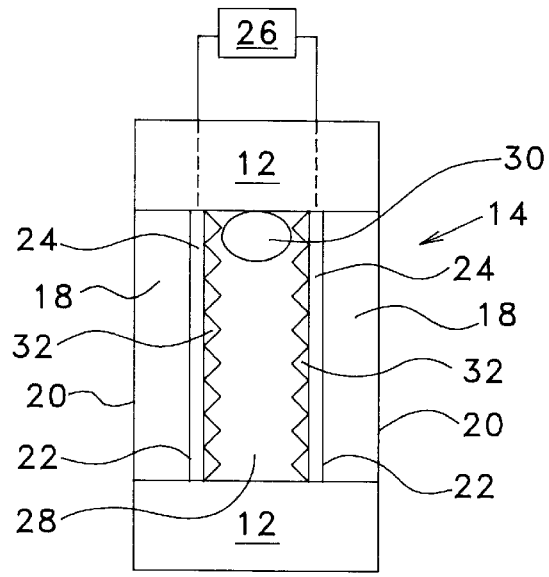
FIG. 2 is a diagrammatic illustration of one of the liquid crystal cells forming part of the eyewear of FIG. 1.
Figure 3A:
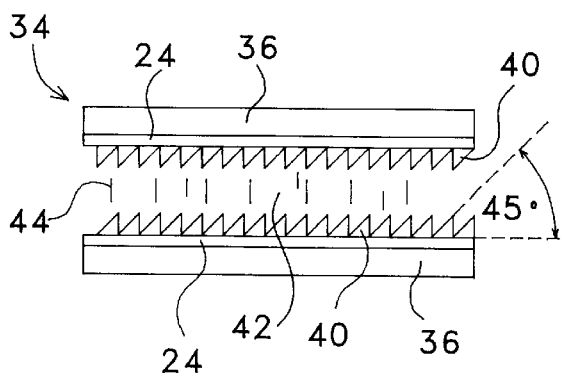
FIG. 3a is a diagrammatic illustration of part of a liquid crystal cell which is especially suitable for use as part of the eyewear of FIG. 1 and which is designed in accordance with one embodiment of the present invention, the cell of FIG. 3a being illustrated in its transmissive, homeotropic state.
Figure 3B:
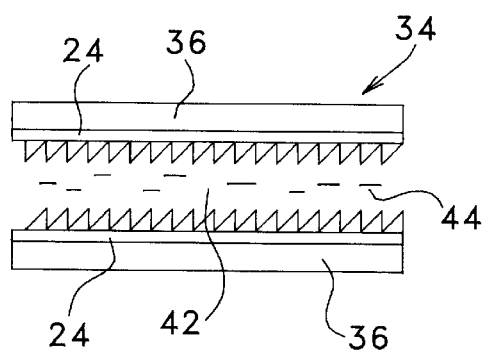
FIG. 3b is a diagrammatic illustration of the liquid crystal cell of FIG. 1 but being illustrated in its light blocking, homogeneous state.

Turning now to the drawings, wherein like components are designated by like reference numerals throughout the figures, attention is immediately directed to FIGS. 3a and 3b, in as much as FIGS. 1 and 2 have been discussed previously.

FIGS. 3a and 3b diagrammatically illustrate a liquid crystal cell which is especially suitable for use in light responsive, transmissivity variable eyewear such as eyewear 10 and which is designed in accordance with what was previously referred as applicant's SiO embodiment. In this regard, it should be noted that the liquid crystal cell, which is generally designated by the reference numeral 34, is shown including only spaced apart transparent substrates 36 corresponding to previously described substrates 18, transparent electrodes 24, cooperating alignment means 40 on the inner confronting surface of each substrate and the guest-host liquid crystal/dye mixture 42 contained between the substrates and the alignment layers. The remaining components that make up the overall cell including those illustrated in FIGS. 1 and 2, where applicable, have not been illustrated in FIGS. 3a and 3b for purposes of clarity.

With particular regard to the liquid crystal/dye mixture 42, as described previously, this mixtures includes nematic liquid crystal molecules having negative dielectric anisotropy and defining long axes and dichroic dye molecules which also define long axes and which preferentially absorb light that is polarized along their long axes. This mixture is well known in the art. In particular, the dichroic dye molecules may be of any suitable type such as azo dyes. They tend to combine with liquid crystal molecules so that as the latter reorient themselves, the dye molecules rotate with them in a connected manner. For purposes of clarity, the combination liquid crystal/dye molecules are illustrated as single, elongated members generally indicated at 44.

Alignment means 40 will be described in more detail immediately below. However, for the time being, it suffices to say each alignment means is homeotropic which means that, in the absence of an electric field, it will cause the liquid crystal molecules and therefore the combination molecules 44 to orient normal to substrates 36, as illustrated in FIG. 3a. This is to be contrasted with homogeneous alignment means which would cause the combination molecules to orient parallel to the substrates 36 in the absence of an electric field. At the same time, the liquid crystal molecules have negative dielectric anisotropy as indicated above. As a result, in the presence of an electric field across the substrates, the combination molecules will extend transverse to the electric field up to an extreme position normal to the electric field when the electric field is strong enough, as illustrated in FIG. 3b. This is to be contrasted with liquid crystal molecules having positive dielectric anisotropy which means that they align with the electric field rather than transverse thereto.

As indicated previously, in many cases what distinguishes one liquid crystal cell embodiment from another in the present application and from the prior art resides in the configuration of its alignment means. One objective of the present invention is to provide alignment for the liquid crystal molecules that induces the desired orientation in the powered state, and that induces the desired orientation in the unpowered state. The purpose is to accomplish the desired optical properties in each state. In the prior art, the properties of at least one state are typically compromised and/or multiple alignment layers are required. For example, using the approach of White and Taylor in their previously recited article, a good homeotropic alignment in the unpowered state may be realized but in the powered state the liquid crystal molecules are not provided with a preferred alignment and hence domains are formed that produce scattering and non-uniformity. In the prior art of Uchida et al. and Senatore, the double alignment layer provides a pre-titled homeotropic guest-host liquid crystal that, according to their results, does not appear to produce scattering in the powered state, but in the unpowered state is somewhat absorbing, presumably because the host molecules are not in the ideal orientation.

In the case of the present invention, as reflected in the liquid crystal cell 34, alignment means 40 on transparent electrodes 24 that coat each substrate 36 cooperate with one another to produce the desired molecular orientations in both the powered and unpowered states. In the particular embodiment illustrated, an approximately 400 Å thick layer of SiO serving as the alignment means is deposited onto the confronting surfaces of substrate 36. The angle of the SiO deposition in a most preferred embodiment is 45° as illustrated in FIG. 3a and the two substrates are mounted opposing each other so that the alignment layers are anti-parallel in the preferred embodiment, i.e. the long axis of the SiO alignment structures at the two surfaces are parallel to each other but with the free end of each structure pointing in opposite directions. The cell is then filled with the liquid crystal/dye mixture 42 at an elevated temperature and subsequently cooled, with the rest of the formation process well known in the art.

In the configuration of alignment means 40, the angle of SiO deposition is crucial. Assuming that 0° corresponds to normal deposition, that is perpendicular to the substrates, as the angle is decreased below 30°, the alignment degrades such that the powered state appears blotchy, giving an extremely blotchy appearance. Without sufficient tilt the alignment does not provide a preferred orientation for the liquid crystal molecules in the powered state, with the result that a blotchy pattern of domains are formed, in which the molecular orientation in different domains differs. As the deposition angle is increased above 60°, the alignment becomes increasingly homogeneous, and thus dark in the unpowered state. Thus, the desired SiO deposition angles are between approximately 30° and 60°, preferably between 40° and 50° and most preferably at 45° as indicated previously. In this regard, while the utilization of SiO as the alignment means has been described, it is to be understood that the present invention is not limited thereto. In particular, other suitable evaporates including, for example, hafnium oxide ($HfO_2$), zirconium oxide ($ZrO_2$), or titanium oxide ($TiO_2$) may be utilized in place of SiO. However, in any case, alignment means 40 should be contrasted with the combination alignment means of SiO and DMOAP described in the Uchida publication recited previously. Alignment means 40 configured in the manner described does not require the DMOAP coating or any other second component.

Figure 4:
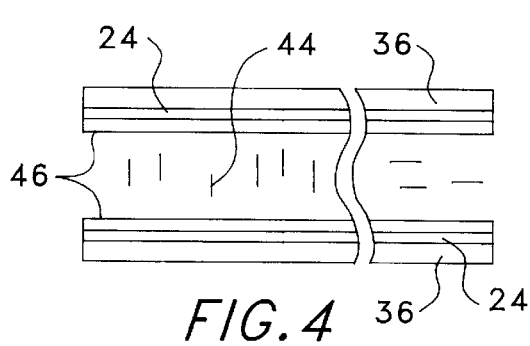
FIG. 4 is a partially broken away diagrammatic illustration of part of a liquid crystal cell which is especially designed for use as part of the eyewear of FIG. 1 and which is designed in accordance with a second embodiment of the present invention.

In accordance with a second, preferred embodiment of the present invention, a liquid crystal cell including alignment means which does not require SiO or other similar evaporate is provided and generally indicated by the reference numeral 44 in FIG. 4. This embodiment includes the same components as cell 34 except for its alignment means, and thus, includes substrates 36, transparent electrodes 24, and liquid crystal/dye mixture 42 as well as the other components described with respect to FIGS. 1 and 2. In addition, liquid crystal cell 44 includes homeotropic alignment means 46 on the inner confronting surfaces of substrates 36, as illustrated in FIG. 4.

In accordance with the present invention, each of the alignment means 46 is composed of a monolayer of long-chained molecules which have been rubbed in a specific way in order to cause the monolayer to in fact function as a specific homeotropic alignment layer, particularly a tilted homeotropic alignment layer which applicants have found more uniformly causes the liquid crystal/dye molecules 40 to move between the homeotropic state in the absences of an electric field and the homogeneous in the presence of an electric field, as depicted in FIG. 4. This is to be contrasted with the use of similar materials as homeotropic alignment layers, but ones which are not rubbed. In this latter case, the homeotropic alignment layers are not tilted and applicants have found do not perform as well as the rubbed and therefore tilted homeotropic layers of the present invention. This embodiment should also be contrasted with the utilization of short-chained silanes which may be rubbed to yield homogeneous alignment, as described in an article entitled, "Alignment layers for improved self-stabilized ferroelectric liquid-crystal devices" published in *Applied Optics,* 33, 2608–2610 (1994) by D. Doroski, S. H. Perlmutter, and G. Moddel.

Examples of monolayers 46 are cetyltrimethyl ammonium bromide (CTAB), octadecyltrimethoxy silane (ODTMS), and hexadecyltrichloro silane (HDTCS). A preferred monolayer is HDTCS, which is a homeotropic surfactant and also a long chained polymer. The cells are prepared as follows: 2% by weight of the surfactant is dissolved in methanol. It is spun-on to the substrate at 3000 RPM, and then baked at 120° C. for 20 minutes. After cooling it is buffed 20 times in a unidirectional manner with parallel registration, using a silk velvet cloth. The cell is then assembled in that standard manner. This method provides an inexpensive means to align a tilted homeotropic liquid crystal. It is simpler than the double alignment layers because there is only one layer, and less expensive than an evaporated layer.

Figure 5:
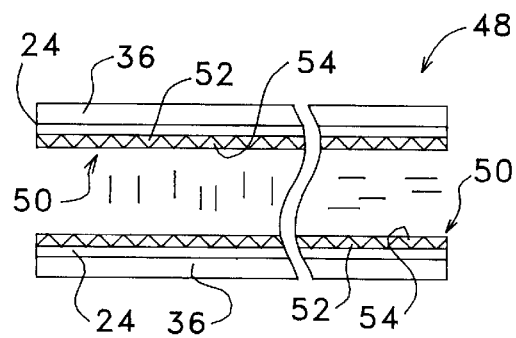
FIGS. 5 is a diagrammatic illustration similar to FIG. 4 but illustrating still further liquid crystal cell embodiment.

Turning now to FIG. 5, a liquid crystal cell 48 designed in accordance with still another embodiment of the present invention is illustrated. Like the previous embodiments, this cell includes substrates 36 and liquid crystal/dye mixture 42. However, it includes different alignment means 50 on the confronting surface of each substrate. In this particular embodiment, each alignment means 50 is comprised of two layers, a first, inner layer of a rubbed polymer formed directly on the confronting surface of the transparent electrode 24 which is over its corresponding substrate 36 and a homeotropic layer which is deposited over it. In an actual embodiment, the rubbed polymer alignment layer is CTAB and the homeotropic alignment layer is SiO. The rubbed polymer alignment layer is rubbed in a way which produces grooves that are relatively large compared to the thickness of the homeotropic alignment layer, that is, the SiO. When the liquid crystal is in its homeotropic state (in the absence of an electric field), as indicated by the left side of the cell as viewed in FIG. 5, the homeotropic alignment layer 54, which is believed to act through local forces, exerts the greater influence on the liquid orientation, that is, greater than the influence of polymer alignment layer 52. On the other hand, when the liquid crystal is in its homogeneous state (in the presence of an electric field), as seen on the right side of the cell as viewed in FIG. 5, the longer-range forces of the underlying rubbed polymer 52 exerts the larger forces.

Still referring to FIG. 5, the homeotropic layer 54 may be designed to optimize the performance of a particular liquid crystal. For example, if the liquid crystal is guest-host mixture 42 in which the long axis of dye is tilted with respect to the long axis of the host nematic liquid crystal, the homeotropic layer may be titled and oriented to minimize optical absorption by the dye in homeotropic state. Consider a mixture in which the dye long axis is tilted 15° with respect to liquid crystal long axis. The homeotropic alignment layer is formed to provide a 15° tilt to the liquid crystal long axis, and the homeotropic alignment layers are formed in an anti-parallel manner, such that the tilt at one substrate is in the opposing direction to the tilt at the other substrate. With this arrangement, the long axis of the dye is oriented normal to the substrates and its orientation is uniform throughout the cell. This produces the least optical absorption possible. In the absence of this pretilt the transmitting state of this liquid crystal mixture would exhibit some absorption.

In each of the cell embodiments described thus far, that is, liquid crystal cells 34, 45, and 48, light polarization is an issue. Specifically, for a negative dielectric anisotropy host nematic liquid crystal in a dichroic dye guest, the alignment layers can provide approximately homeotropic alignment in the unpowered state, and approximate homogeneous alignment in the powered state. In the powered state, the dye absorbs dominantly one polarization of incident light. Thus, for unpolarized incident light, only approximately one-half of the incident light is modulated by the device. A polarizer may be placed in series with the device in such an orientation that it transmits light only that is polarized 90° with respect to the light transmitted by the dye in its homogeneous state. Thus, the combination of the polarizer and the liquid crystal in the powered state can absorb over 90% of the incident light. The disadvantage of this approach is that at least 50% of unpolarized incident light is blocked by the combination in the unpowered state because of the polarizers. As will be seen below, the next two embodiments to be described address this situation.

Figure 6:
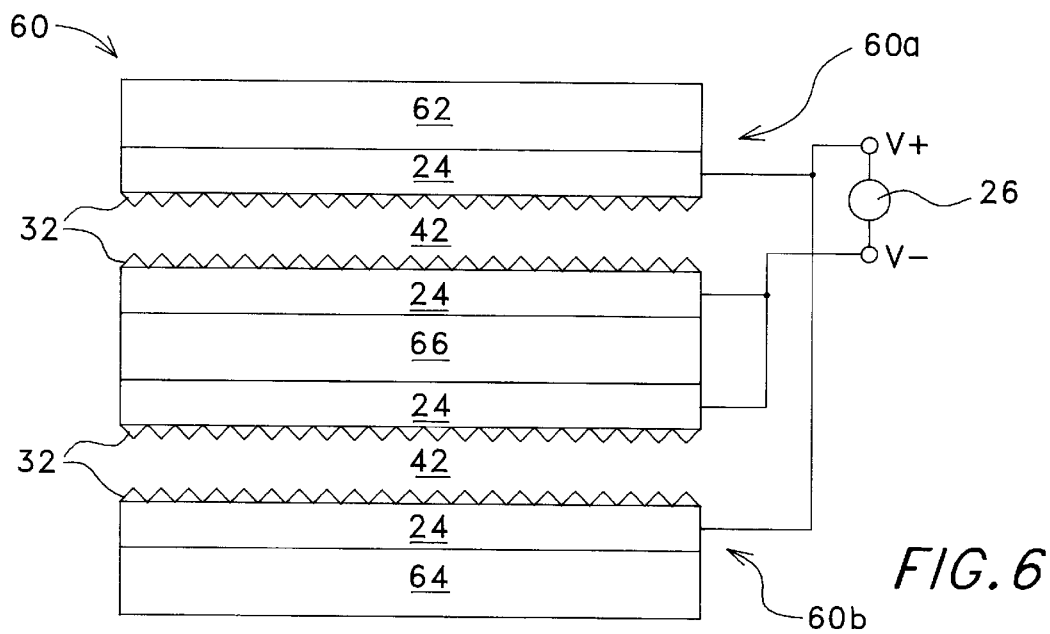
FIG. 6 is a diagrammatic illustration of part of a stacked two-cell liquid crystal cell which is especially suitable for use as part of the eyewear of FIG. 1 and which is designed in accordance with still a further embodiment of the present invention.

Another way to eliminate the polarization problem is illustrated in the dual cell liquid crystal cell which is illustrated in FIG. 6 and which is designated by the reference numeral 60. In this embodiment, three substrates are utilized, two outer substrates 62 and 64 and an intermediate or sandwiched substrate 66, all of which are stacked in the manner illustrated. Liquid crystal/dye mixture 42 is contained between both substrates 62 and 66 and substrates 66 and 64 so as to form two liquid crystal subcells 60a and 60b and, to this end, the two subcells include all of the other necessary components described previously including, for example, transparent electrodes and alignment layers in order for each of the subcells to function in the manner described with respect cells 34, 45, and 48 or, in fact, any other type of liquid crystal cell. Specifically, as illustrated in FIG. 6, the subcell 60a includes transparent electrodes 24 on confronting surfaces of substrates 62 and 66 and the subcell 60b includes transparent electrodes 24 on confronting surfaces of substrates 64 and 66. Moreover, each of these electrodes is connected to a voltage control arrangement 26 such that a voltage is applied across each subcell in the manner described above. At the same time, there is disposed between each substrate and its transparent electrode homeotropic alignment means 32.

The only difference between dual cell 60 and the previous cells is that, in the case of cell 60, the two subcells are oriented relative to one another such that when the subcells are aligned homogeneously (in the presence of an electric field) each subcell absorbs light of a polarization opposite to that of the other subcell. In that way, the overall cell can absorb substantially all unpolarized light and achieve the relatively high contrast ratio discussed above.

Figure 7:
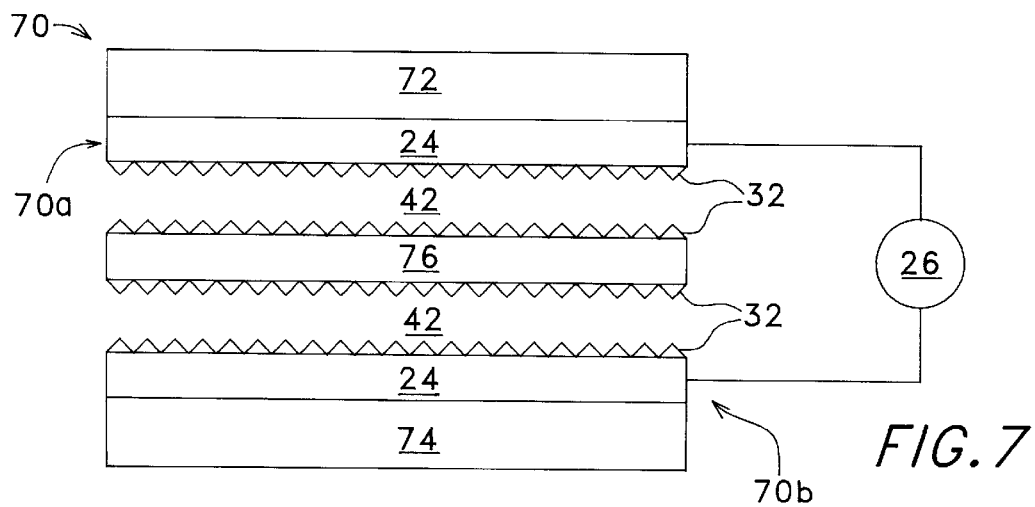
FIG. 7 is a diagrammatic illustration of yet a further liquid crystal cell embodiment, specifically a single cell version using two liquid crystal layers with a divider therebetween.

Still another way to eliminate the polarization problem and achieve the desired contrast ratio discussed is illustrated in a second dual cell liquid crystal cell which is illustrated in FIG. 7 and which is designated by the reference numeral 70. In this embodiment, three substrates are utilized, two outer substrates 72 and 74 Corresponding to the substrates 62 and 64 shown in FIG. 6 and an intermediate or sandwiched substrate 76 corresponding to but much thinner than intermediate substrate 66 shown in FIG. 6. In fact, while all of the substrates 62, 64, 66, 72 and 74 are most likely equal in thickness, substrate 76 is much thinner for the reasons to be discussed below. As seen in FIG. 7 all of the layers 72, 74 and 76 are stacked in the manner illustrated there.

Still referring to FIG. 7, liquid crystal/dye mixture 42 is contained between both substrates 72 and 76 and substrates 76 and 74 so as to form two liquid crystal subcells 70a and 70b and, to this end, the two subcells includes all of the other necessary components described previously including, for example, transparent electrodes and alignment layers in order for each of the subcells to function in the manner described with respect cells 34, 45, 48 and 60 or, in fact, any other type of liquid crystal cell. However, as will be seen below, in the case of cell 70, because intermediate layer 76 is much thinner than intermediate layer 66 in cell 60, it is only necessary to include transparent electrodes 24 across the confronting surfaces of outer substrates 72 and 74 and not across the opposite surfaces of intermediate layer 76. This is in contrast with cell 60 in which transparent layers are provided on opposite sides of intermediate layer 66.

Specifically, as illustrated in FIG. 7, the overall cell 70 includes transparent electrodes 24 on confronting surfaces of substrates 72 and 74 but not on intermediate substrate 76. Moreover, each of these electrodes is connected to a voltage control arrangement 26 such that a single voltage is applied across both of the liquid crystal layers 32. At the same time, on opposite sides of each liquid crystal layer there are disposed cooperating homeotropic alignment means 32 as in the cells described above.

In the case of cell 70, the intermediate substrate 76 must be sufficiently thin and the voltage control arrangement 26 must be sufficiently designed such that a sufficiently large single voltage is applied simultaneously across both liquid crystal layers so that the two subcells 70a and 70b operated in the manner described above. In the case of cell 60, its intermediate substrate 66 may be, for example 2 millimeters thick (i.e. the same thickness as substrates 62 and 64), whereas intermediate substrate 76 is, for example in the range of 1 to 250 microns thick, that is much thinner than substrate 66. At the same time, it may be necessary to increase the single voltage across the two subcells 70a and 70b as contrasted with the individual voltages across the subcells 60a and 60b. For example, the voltage across each subcell 60a and 60b could be 3 volts while the total voltage across subcells 70a and 70b could be 10 volts which is divided between the two subcells.

The only difference between dual cell 70 and cell 60 is that the former does not require the thicker intermediate substrate and therefore can be provided in an overall thinner design and, of course, only two transparent electrodes are necessary. Moreover, if the intermediate layer 76 and its opposing liquid crystal layers are sufficiently thin, it may be possible to use the same voltage control arrangement 26 as cell 60, thereby making the overall cell 70 more economical than cell 60.

One way to make cell 70 is as follows. The outer substrates 72 and 74 having thickness' of 1 millimeter each has the standard SiO (alignment means 32) deposited at 45° from the normal, over ITO (transparent electrode 24) which is applied to the appropriate surface of the substrate. A 200 micron thick glass (intermediate substrate 76) is dipped into a 1% CTAB solution for 20 minutes and then blown dry. The inner surfaces of the outer substrates 72 and 74 are sprayed with 8 micron spacers, and are assembled such that the evaporated directions are perpendicular to each other, with the thin glass substrate 76 in between. The entire assembly is fixed with epoxy and filled with liquid crystal. This particular cell was made in this manner and good contrast was obtained by applying a 70 volts ac at a frequency of 1 kHz. Improvements to this includes the use of much thinner glass or other flexible divider material, and possibly forming a standard 45° SiO alignment layer on both sides of the divider, rather than just using the CTAB homeotropic surfactant. An actual cell in accordance with the FIG. 7 embodiment of the present has been made with the following characteristics: (i) absorbtion of about 10% (or less) of the transmitted white light by the liquid crystal in the unpowered (clear) state and (ii) absorption of about 96% of the transmitted light in the fully powered (fully dark) state, with continuous gray levels for intermediate drive voltages. That amounts to a contrast ratio of 22.5.

In all of the liquid crystal cell embodiments described herein, each was described as being especially suitable for use in light responsive, transmissivity-variable eyewear. While this is certainly the case, it is to be understood that the present invention is not limited to that particular application. Moreover, when the various liquid crystal cells are used in other applications that do not require a guest-host liquid crystal/dye mixture or the particular one described, the various embodiments of the present invention are no less applicable if they are compatible with the particular applications in question. Further, it is to be understood that the present invention is not necessarily limited to the particular components recited so long as other components and materials are compatible with the present invention. Further, the eyewear is not limited to regular sunglasses but rather contemplates other uses including, for example, motorcycle and ski goggles.

What is claimed is:

1. A liquid crystal cell for use in light responsive, transmissivity variable eyewear which is exposed to unpolarized light, said cell comprising:
   (a) first subcell means including a liquid crystal mixture for acting on said unpolarized light as the latter passes through said liquid crystal mixture in a way which causes light of a first polarization making up said unpolarized light to be attenuated as a function of a particular variable; and
   (b) second subcell means including a liquid crystal mixture positioned immediately adjacent the first subcell means for acting on said unpolarized light passing through the liquid crystal mixture in a way which attenuates light of the second polarization of the polarized light in accordance with that variable, whereby all of the light of said unpolarized light is attenuated as a function of said variable,
   said first and second subcells being substantially identical but oriented differently with respect to one another so as to attenuate both of said polarizations of said unpolarized light, each of said subcells including:
      (i) a pair of spaced apart transparent substrates in confronting parallel relationship to one another so as to include outer confronting surfaces and inner confronting surfaces, the latter being substantially uniformly spaced from one another along the entire extent of the substrates;
      (ii) a pair of transparent electrodes respectively disposed over the outer surfaces of said substrates and connectable to a voltage control arrangement in which under one condition an electric field is applied across the pair of substrates in a direction normal to their inner and outer surfaces and under a second condition no electric field is applied across said substrates;
      (iii) a guest-host liquid crystal/dye mixture contained between the inner confronting surfaces of said substrates, said mixture including
      liquid crystal molecules having negative dielectric anisotropy and defining long axes and
      dichroic dye molecules which also define long axes and which preferentially absorb light that is polarized along their long axes; and
      (iv) tilted homeotropic alignment means disposed on the inner confronting surface of each of said substrates for acting on said guest-host liquid crystal/dye mixture such that, in the absence of an electric field across said substrates, the long axes of said liquid crystal and dye molecules line up relative to said substrate in a way which causes the dye molecules not to absorb substantially any light that is directed through the guest-host liquid crystal/dye mixture normal to the substrates whether the light passing therethrough is polarized or not, whereby the liquid crystal cell is substantially clear in the absence of said electric field and such that, in the presence of said electric field across said substrates, the long axes of said liquid crystal and dye molecules line up relative to said substrates in a way which causes the dye molecules to absorb at least some light that is directed through the guest-host liquid crystal/dye mixture normal to the substrates so long as the last-mentioned light is polarize along the long axes of the dye molecules, whereby the liquid crystal cell darkens in the presence of said electric field.

2. A liquid crystal cell for use in light responsive, transmissivity variable eyewear which is exposed to unpolarized light, said cell comprising:
   (a) first subcell means including a liquid crystal mixture for acting on said unpolarized light as the latter passes through said liquid crystal mixture in a way which causes light of a first polarization making up said unpolarized light to be attenuated as a function of a particular variable; and
   (b) second subcell means including a liquid crystal mixture positioned immediately adjacent the first subcell means for acting on said unpolarized light passing through the liquid crystal mixture in a way which attenuates light of the second polarization of the polarized light in accordance with that variable, whereby all of the light of said unpolarized light is attenuated as a function of said variable,
   said first and second subcells being substantially identical but oriented differently with respect to one another so as to attenuate both of said polarizations of said unpolarized light,
      wherein each of said subcells includes a separate and distinct outer substrate and a common intermediate substrate in confronting parallel relationship to one another so as to include outer confronting surfaces and inner confronting surfaces, the latter being substantially uniformly spaced from one another along the entire extent of the substrates;
      wherein a pair of transparent electrodes are respectively disposed over the inner surfaces of said outer substrates and connectable to a voltage control arrangement in which under one condition an electric field is applied across both subcells in a direction normal said inner surfaces and under a second condition no electric field is applied across said substrates;
      wherein a guest-host liquid crystal/dye mixture is contained between each outer substrate and the adjacent intermediate common substrate, said mixture including
      liquid crystal molecules having negative dielectric anisotropy and defining long axes and
      dichroic dye molecules which also define long axes and which preferentially absorb light that is polarized along their long axes; and
      wherein tilted homeotropic alignment means are disposed on the inner confronting surface of each of said outer substrates for acting on said guest-host liquid crystal/dye mixture (i) such that, in the absence of an electric field across said substrates, the long axes of said liquid crystal and dye molecules line up relative to said substrates in a way which causes the dye molecules not to absorb substantially any light that is directed through the guest-host liquid crystal/dye mixture normal to the substrates whether the light passing therethrough is polarized or not, whereby the liquid crystal cell is substantially clear in the absence of said electric field and (ii) such that, in the presence of said electric field across said substrates, the long axes of said liquid crystal and dye molecules line up relative to said substrates in a way which causes the dye molecules to absorb at least some light that is directed through the guest-host liquid crystal/dye mixture normal to the substrates so long as the last-mentioned light is polarize along the long axes of the dye molecules, whereby the liquid crystal cell darkens in the presence of said electric field.

3. Light responsive, transmissivity variable eyewear, comprising:
   (a) a frame;

(b) a voltage control arrangement operable between a first voltage condition and a second voltage condition; and (c) at least one liquid crystal cell supported by said frame, said cell including
   (i) first subcell means including a liquid crystal mixture for acting on unpolarized light as the latter passes through said liquid crystal mixture in a way which causes light of a first polarization making up said unpolarized light to be attenuated as a function of a particular variable,
   (ii) second subcell means including a liquid crystal mixture positioned immediately adjacent the first subcell means for acting on said unpolarized light passing through the liquid crystal mixture in a way which attenuates light of the second polarization of the polarized light in accordance with that variable, whereby all of the light of said unpolarized light is attenuated as a function of said variable, said first and second subcells means including first and second outer substrates and a common inner substrate, said voltage control means including means for applying individual voltages across said first outer substrate and common substrate and said second outer substrate and said common substrate respectively.

* * * * *